US009151067B2

(12) United States Patent
Hall

(10) Patent No.: US 9,151,067 B2
(45) Date of Patent: Oct. 6, 2015

(54) METHOD OF ATTACHING A CABINET ASSEMBLY TO A HOT TUB

(71) Applicant: QUAD CITIES AUTOMATIC POOLS, INC., Bettendorf, IA (US)

(72) Inventor: Keith A. Hall, Bettendorf, IA (US)

(73) Assignee: QUAD CITIES AUTOMATIC POOLS, INC., Bettendorf, IA (US)

( * ) Notice: Subject to any disclaimer, the term of this patent is extended or adjusted under 35 U.S.C. 154(b) by 290 days.

(21) Appl. No.: 13/964,401

(22) Filed: Aug. 12, 2013

(65) Prior Publication Data

US 2013/0328464 A1 Dec. 12, 2013

Related U.S. Application Data

(63) Continuation-in-part of application No. 12/957,654, filed on Dec. 1, 2010, now Pat. No. 8,528,211.

(51) Int. Cl.

| | |
|---|---|
| ***B23P 17/04*** | (2006.01) |
| ***E04H 4/14*** | (2006.01) |
| ***A61H 33/00*** | (2006.01) |
| ***E04H 4/00*** | (2006.01) |

(52) U.S. Cl.

CPC .............. *E04H 4/14* (2013.01); *A61H 33/6005* (2013.01); *E04H 4/005* (2013.01); *E04H 4/0037* (2013.01); *Y10T 29/49826* (2015.01)

(58) Field of Classification Search

CPC A61H 33/6005; E04H 4/0025; E04H 4/0037; E04H 4/005; E04H 4/14; B29L 2031/7692; Y10T 29/49826

See application file for complete search history.

(56) References Cited

U.S. PATENT DOCUMENTS

| | | | | |
|---|---|---|---|---|
| 2,056,024 | A | 8/1935 | Stuart | |
| 3,298,038 | A | 1/1967 | O'Connell et al. | |
| 3,877,085 | A | 4/1975 | Bukaitz | |
| 3,974,605 | A * | 8/1976 | Beatty et al. | 52/481.1 |
| 5,741,453 | A * | 4/1998 | Kennedy | 264/237 |
| 2004/0103472 | A1 | 6/2004 | Marbach et al. | |
| 2005/0132487 | A1 | 6/2005 | Layfield | |
| 2009/0165201 | A1 | 7/2009 | Vultaggio | |
| 2009/0172873 | A1 | 7/2009 | Ludlow et al. | |
| 2009/0211011 | A1* | 8/2009 | Walker et al. | 4/506 |
| 2010/0031434 | A1 | 2/2010 | Tassone, Jr. et al. | |
| 2011/0000013 | A1 | 1/2011 | Elnar | |

* cited by examiner

*Primary Examiner* — Alexander P Taousakis

(74) *Attorney, Agent, or Firm* — Zarley Law Firm, P.L.C.

(57) ABSTRACT

A method of attaching a cabinet assembly to a spa. The method includes providing a frame that has a channel that forms a perimeter. A spa is placed on the frame such that a flange or lip of the spa extends past the perimeter created by the channel. A plurality of slats are then secured between the flange of the spa and the channel of the frame in order to form a cabinet around the spa. The spa having a pan and a toe kick secured adjacent its bottom end.

20 Claims, 7 Drawing Sheets

METHOD OF ATTACHING A CABINET ASSEMBLY TO A HOT TUB

CROSS REFERENCE TO RELATED APPLICATIONS

This application is a Continuation-In-Part of U.S. Ser. No. 12/957,654 filed Dec. 1, 2010.

BACKGROUND OF THE INVENTION

This invention relates to an assembly of a spa or hot tub. More specifically, this invention relates to attaching the cabinet assembly around and to a hot tub.

Spas have been used for leisure activities for many years. Specifically, a large tub is presented that holds heated water and typically contains a plurality of jets to whirl water around the tub as desired. Typically, a spa is held up by a frame that is not aesthetically pleasing to a casual observer. As a result, a cabinet assembly is placed around the frame to provide a more aesthetically pleasing look.

This cabinet assembly is made by building a wooden or metal frame and then securing to that frame a plurality of rigid individually manufactured panels utilizing fastening members such as screws. Then, if this cabinet assembly is built separate from the spa, the spa still needs to be either placed within the cabinet assembly or the cabinet assembly placed around the spa.

While this wood frame used in combination with the manufactured rigid panels covers up the spa frame thus providing an aesthetically pleasing look, problems still remain. Specifically, building the wood frame is not only time consuming but additionally the individually manufactured pieces can be very costly. In addition, the wood frame provides minimal insulation for the hot tub or spa itself wherein often the water within the spa is desired to be at an elevated temperature. Thus, inefficiencies of the spa occur.

In addition, problems occur with cabinets used as a part of spas because the environment in which spas are generally used is harsh and causes deterioration over time. This is because conventionally many spas are merely placed on the open ground. This often leads to the lower end of the spa cabinet being continually exposed to a certain amount of moisture which causes accelerated deterioration to the lower portion of a wood cabinet. In addition, what complicates the matter is that water, moisture, chemicals and heat are an intrinsic and unavoidable part of spas. These conditions can accelerate and further contribute to the deterioration of a spa's cabinet.

Therefore, a principal object of the invention is to provide a method of attaching a cabinet assembly to a spa that is both efficient and cost effective.

Another object of the invention is to provide a cabinet assembly that resists deterioration over time.

Yet another object of the invention is to provide a system wherein a single frame can be used with several configurations while being simplistic in design.

Yet another object of the invention is to provide a spa system wherein the panels are quickly and easily reversible.

These and other objects, features or advantages will become apparent from the specification and claims.

BRIEF SUMMARY OF THE INVENTION

A method of attaching a cabinet assembly to a spa. The steps include providing a frame that has a plurality of channels that form a perimeter that is of size and shape to receive a spa. This spa is then placed onto the frame such that a flange or lip extends from the spa past the perimeter of the frame such that the flange is positioned in parallel spaced relation to at least one of the plurality of channels. Once the spa is in place, insulating panels are inserted between the flange of the spa and the plurality of channels of the frame. A plurality of flexible slats are then secured between the flange of the spa and the channel to form a cabinet around the spa thus covering the frame and insulating panels of the spa. The spa having a pan and a toe kick secured adjacent its bottom end.

DETAILED DESCRIPTION OF THE PREFERRED EMBODIMENT

Figure 1:
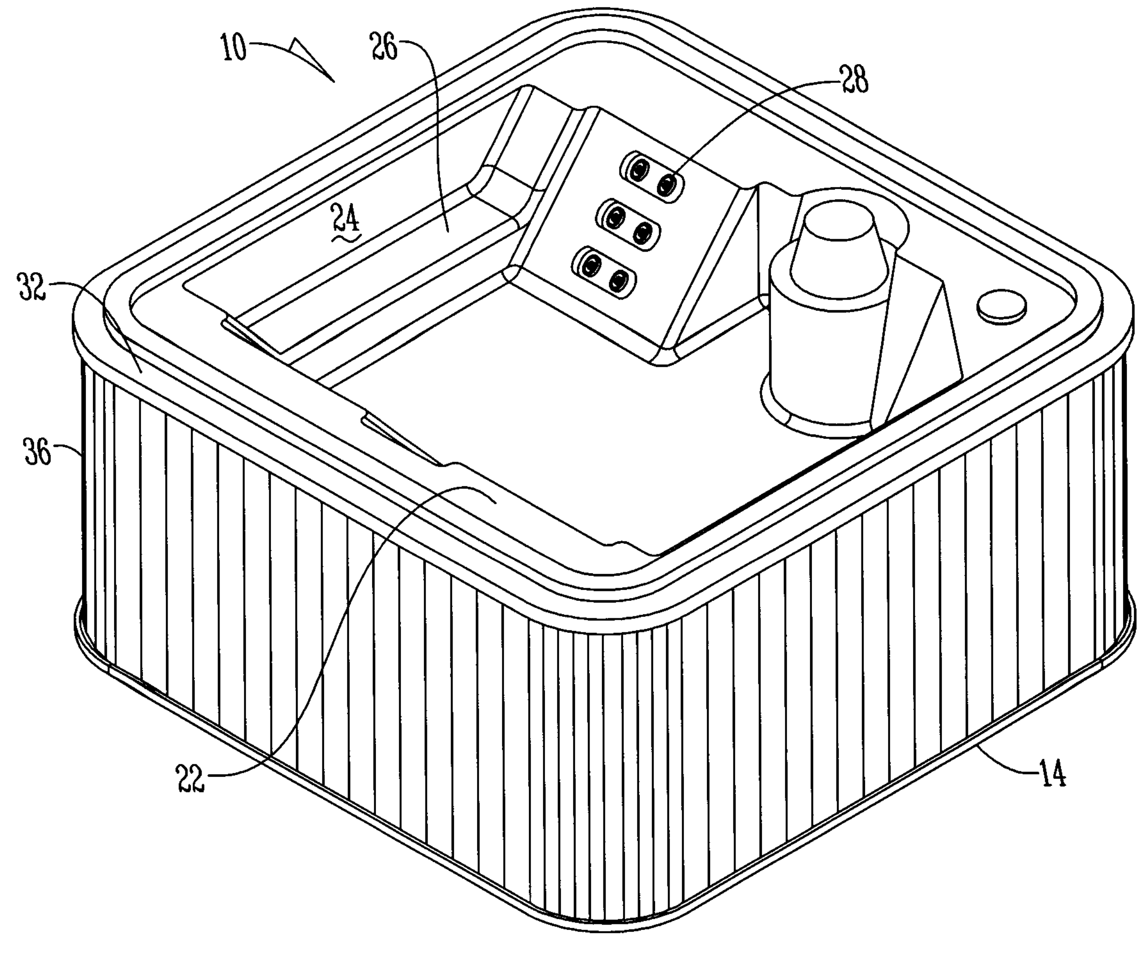
FIG. 1 is a perspective view of a cabinet assembly.
Figure 2:
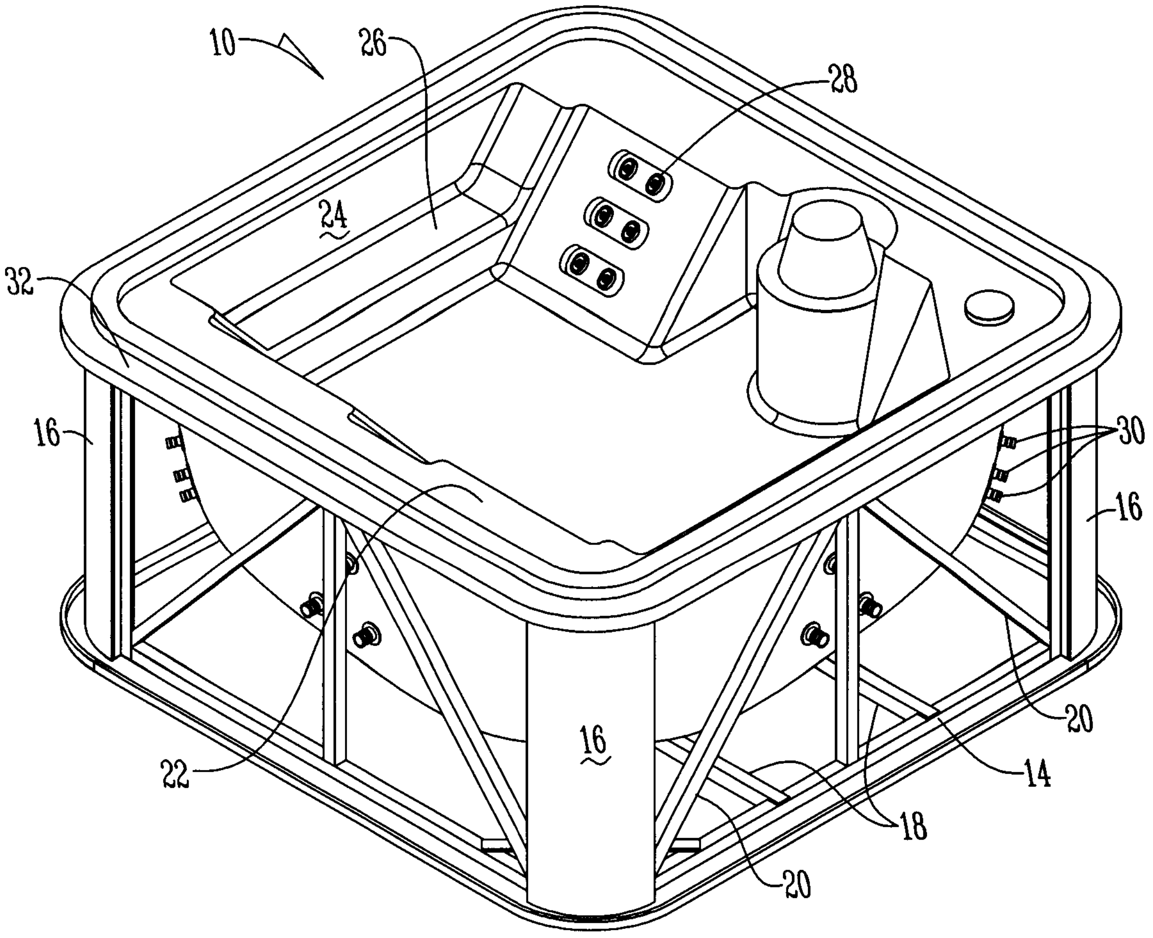
FIG. 2 is a perspective view of a spa within a frame of a cabinet assembly.

The figures show a cabinet assembly 10 that includes a frame 12. The frame 12 has channel 14 that is secured to a plurality of posts 16 in order to form a perimeter that is of size and shape to accommodate a spa or a hot tub. The posts 16 can be of single piece construction or be formed of three corner brace sections. The three brace embodiment allows the corners to be universal regardless of length. In a preferred embodiment, the channel 14 is a U-shaped channel; however, an L-shaped or J-shaped channel or the like could be used without falling outside the scope of this disclosure. Extending between individual channels 14 are a plurality of horizontal brace members 18 that provide additional structural support to the frame 12. Similarly, a plurality of brace members 20 are secured to the channel 14 and extend diagonally and vertically to form a king post truss to provide additional support and strength.

Placed on top of the vertical brace members 20 and post 16 of the frame 12 is a spa or a hot tub 22. The spa or hot tub 22 is of any kind known in the art and typically has a fiberglass body 24 that forms a cavity 26 that receives water and additionally has a plurality of openings 28 disposed therein for receiving nozzles 30 and the like. Also, as known in the art, the spa 22 has a flange or lip 32 at its top outer perimeter, that in one arrangement extends outwardly and over the exterior perimeter of frame 12. In order to form the cabinet assembly 10 of the invention the spa 22 is placed on the frame 12 such that the flange 32 extends past the frame 12 and is positioned in parallel spaced relation from the channel 14. In one embodiment the frame 12 is a galvanized powder-coated steel frame.

Figure 3:
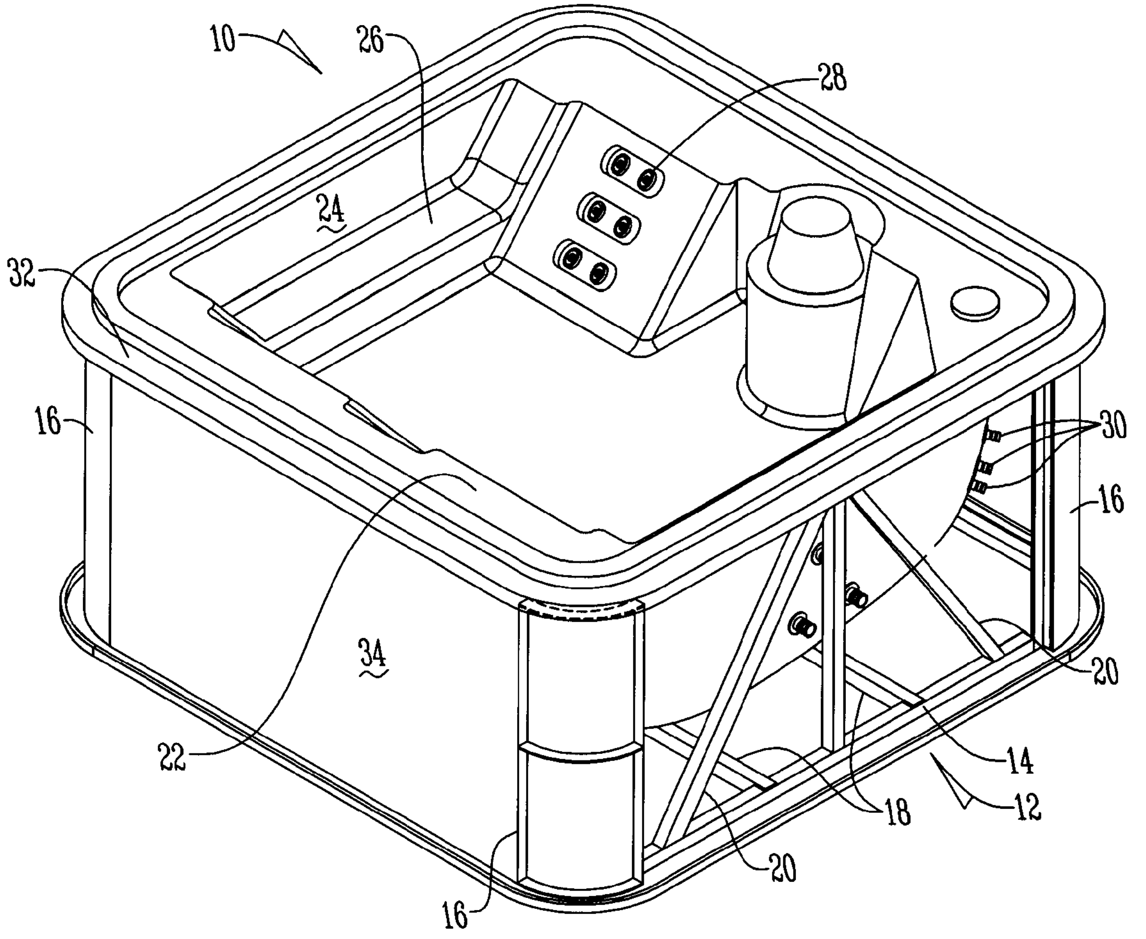
FIG. 3 is a perspective view of a spa within a frame that contains an insulating panel of a cabinet assembly.
Figure 4:
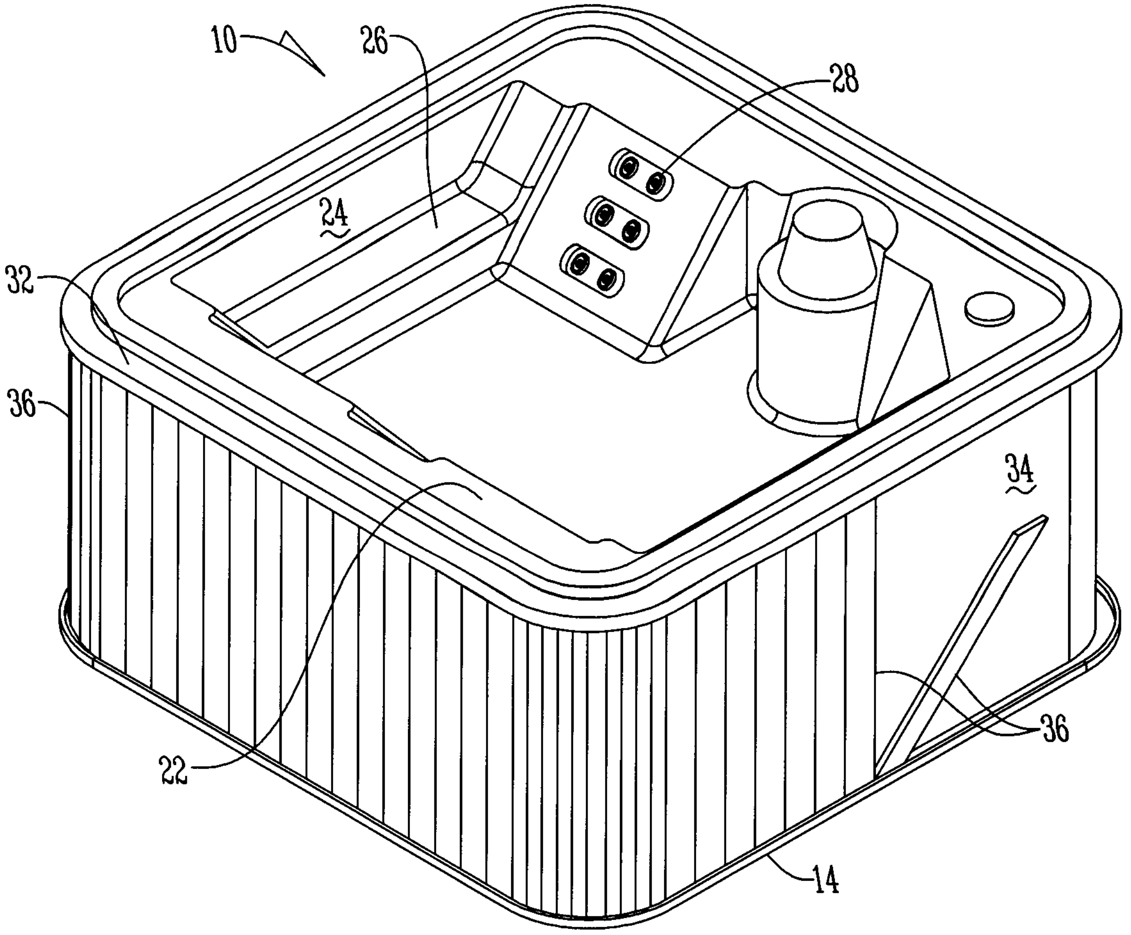
FIG. 4 shows a perspective view of a plurality of slats that have been secured to the frame and spa of a cabinet assembly.

FIG. 3 shows insulating panels 34 that are placed between an individual channel 14 and the flange 32 of the spa 22 such that the insulating panel 34 is secured therebetween. Individual panels can be placed within any side of the frame to provide additional insulation for the spa 22.

After a plurality of insulating panels 34 are in place around the spa 22 a plurality of slats 36 are placed between the individual channels 14 and the flange 32 of the spa 22. Preferably the plurality of slats 36 are made of an elastic material such as plastic such that the plurality of slats 36 can individually be snapped into place between the channel 14 and the flange 32 of the spa 22, however any other material is hereby contemplated for use. When securing the plurality of slats 36 between the flange 32 of the spa 22 and channel 14 to form a cabinet around the spa 22, the flange 32, spa 22 and the channel 14 place tension on the plurality of slats 36 in order to secure the plurality of slats 36 in place.

In operation, in order to attach the cabinet assembly 10 to the spa 22, the frame 12 having the channel 14 that form a perimeter is provided. Next, the spa 22 is placed onto the frame 12 such that a flange 32 extends from the spa 22 past the perimeter of the frame 12 so that the flange is positioned in parallel spaced relation to the channel 14. The insulating panels 34 are then inserted within and in between the flange 32 of the spa 22 and the channel 14. Once the insulating panels 34 are in place, a plurality of slats 36 are secured between the flange 32 of the spa 22 and channel 14 to form a cabinet around the spa 22.

By utilizing the cabinet assembly 10 there is no longer a need for a wood frame and panelized system to produce a cabinet assembly. Instead, by using the cabinet assembly 10 an insulated metal frame can be quickly and easily assembled by snapping in the plurality of slats 36. Thus, assembly time is reduced as the individual assembling the cabinet no longer has to use fastening materials such as screws to secure together a wooden frame. In addition, by using the plastic slats for the cabinet assembly, cost is greatly reduced. Thus, not only does the cabinet assembly reduce costs but additionally the assembly saves time during installation. In addition, the insulating panel 34 provides an extra layer of insulation and thus at the very least all of the stated objectives have been met.

Figure 5:
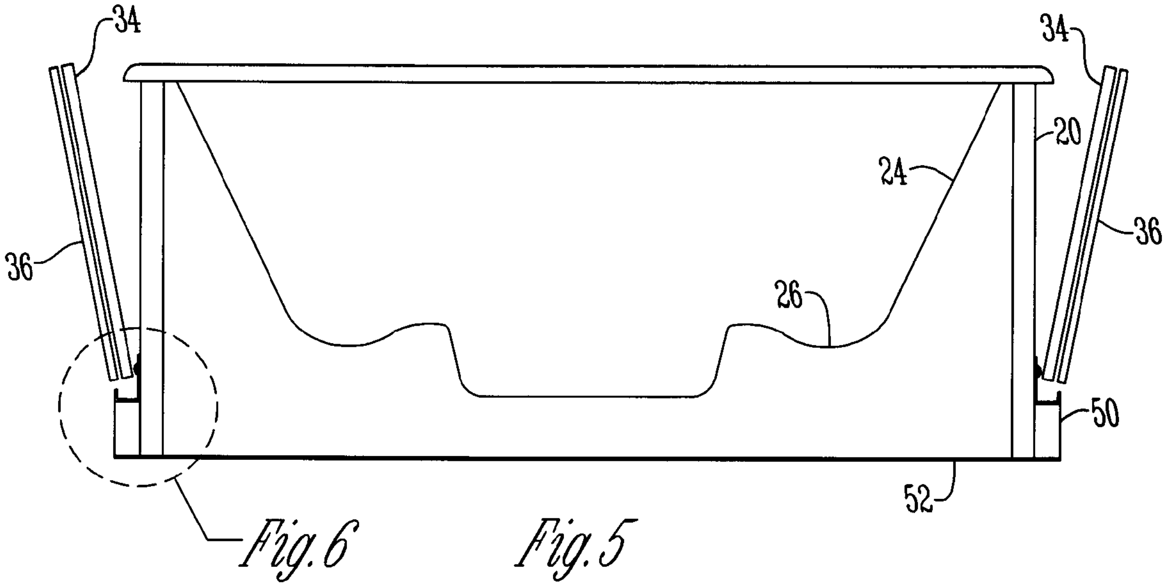
FIG. 5 is a elevation view of a spa having a cabinet assembly that includes a toe kick positioned around the periphery of the spa with the channel connected to the top surface of the toe kick and a pan covering the bottom surface of the cabinet assembly, the view shows a slat and insulating panel about to be assembled into the channel and held between the channel and the flange of the spa.
Figure 6:
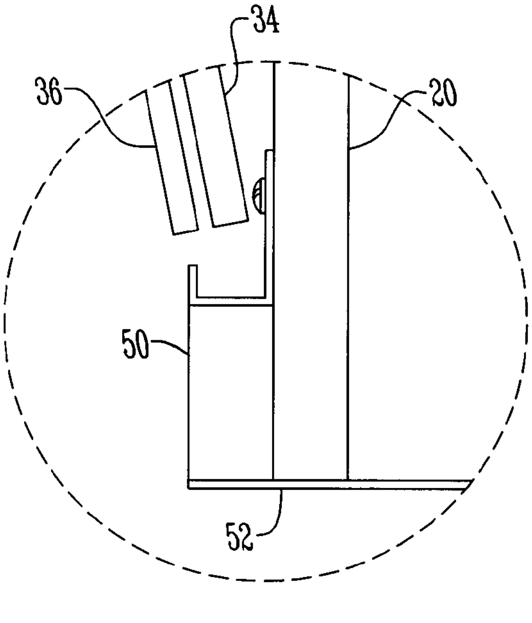
FIG. 6 is a close-up elevation view of the spa of FIG. 5 focused on the toe kick in the periphery of the cabinet assembly, the channel positioned on the toe kick and the pan covering the bottom surface of the cabinet assembly.

In an alternative embodiment, with reference to FIGS. 5 & 6, toe kick 50 and a pan 52 is presented and used in association with the cabinet assembly 10 described herein. Toe kick 50 is formed of any suitable size, shape and design. In one arrangement, as is shown, toe kick 50 is an elongated member such as a board. Toe kick 50 is positioned at the bottom edge of cabinet assembly 10 and extends around the entire perimeter of frame 12. In one arrangement, toe kick 50 is positioned just outside of and connected to the exterior edge of cabinet assembly 10 and frame 12 adjacent its bottom edge (as is shown in FIG. 6). Alternatively, toe kick 50 is positioned below the other components of cabinet assembly 10 and frame 12, or said another way, the cabinet assembly 10 and frame 12 are positioned on top of toe kick 50. Toe kick 50 is secured to cabinet assembly 10 and frame 12 by any conventional means such as screwing, bolting, snap-fitting, tongue-and-groove, adhesives, or the like.

In one arrangement toe kick 50 is formed of a single continuous piece which is formed by any means. In one arrangement, pan 52 is formed of a flexible material, such as a sheet of flexible plastic. In an alternative arrangement, pan 52 is formed of a rigid material, such as a rigid plastic. In one arrangement, pan 52 is formed of a single unitary sheet of polyethylene that is approximately of 90 gage thickness (90 thousandths of an inch).

Pan 52 is secured to the bottom surface of toe kick 50 frame 12 and the other components of cabinet assembly 10 by any conventional means such as screwing, bolting, snap-fitting, tongue-and-groove, adhesives, welding or the like. In one arrangement, the entire periphery of pan 52 is adhesively secured around the entire periphery of toe kick 50 thereby sealing the entire bottom end of cabinet assembly 10. In one arrangement, the exterior periphery of pan 52 is in alignment with the exterior periphery of toe kick 52. In an alternative arrangement, the exterior periphery of pan 52 is spaced inward from the exterior periphery of toe kick 52 a distance, such as ¼ inch, ⅓ inch, ½ inch or the like, so as to prevent snagging the edge of pan 52 while moving or assembling the cabinet assembly 10 as well as to prevent pan 52 from being seen below toe kick 50. In an alternative arrangement, with reference to FIG. 6, the pan extends upwardly between inward side of toe kick 50 and the outward side of brace member 20, thereby being pinched and held therebetween.

In the arrangement shown in FIGS. 5 and 6, channel 14 is positioned on top of toe kick 50 and pan 52. In the arrangement shown, the channel 14 is a J-shaped channel with the interior lip extending upwardly a longer distance than the exterior lip. The longer extension of the interior lip allows for easy connection of the channel 14 to components of the cabinet assembly 10, such as brace member 20 with a conventional fastener such as a screw or bolt (as is shown in FIGS. 5 and 6). In the arrangement shown, the bottom surface of channel 14 is in flush alignment with the upper surface of toe kick 50. In one arrangement, toe kick 50 and channel 14 are separate pieces; however in another arrangement toe kick 50 and channel 14 are formed of a single unitary piece.

Also seen in FIGS. 5 and 6 is the presence of insulating panel 34 positioned behind slats 36. In this arrangement, the lower end of slats 36 and insulating panel 34 are held within the channel 14. The thicknesses of slats 36 and insulating panel 34 are held within close tolerances such that the combined thickness causes a tight frictional engagement of the lower end of slats 36 and insulating panel 34 within the channel 14. In this arrangement, the slats 36 are relatively incompressible while the insulating panel 36 is somewhat compressible. As such, when the lower end of slats 36 and insulating panel 34 are inserted within the channel 14 the insulating panel 34 partially compresses allowing slat 36 to fit therein while applying an expansive force which helps to hold the slats 36 and insulating panel 34 within channel 14. While this expansive force holds the slats 36 and insulating panel 34 within the channel 14, the slats 36 can still be easily removed by the user for repair, replacement or access within the spa 10.

Another improvement of the arrangement is that slats 36 are reversible. That is, the slats 36 have two faces that are of suitable aesthetic appearance. In this arrangement, in the event that a slat or plurality of slats 36 get damaged, such as scratched, dinged, stained or faded by the sun, the user can quickly and easily remove the slats 36 (as is described herein), flip them around, and install them (as is described herein)

with the other side facing outward. This reduces the cost of repairs for the owner and improves the aesthetic appearance of the spa 10.

Figure 7:
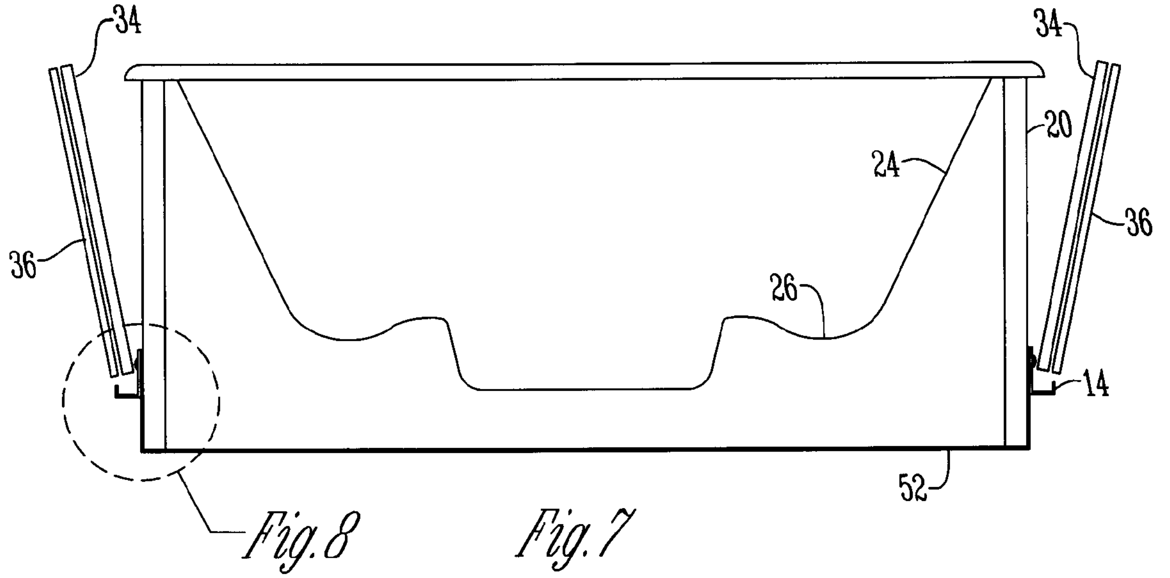
FIG. 7 is an elevation view of a modified version of the spa of FIG. 5, with the toe kick removed and the channel connected to an upwardly extending lip of the pan.
Figure 8:
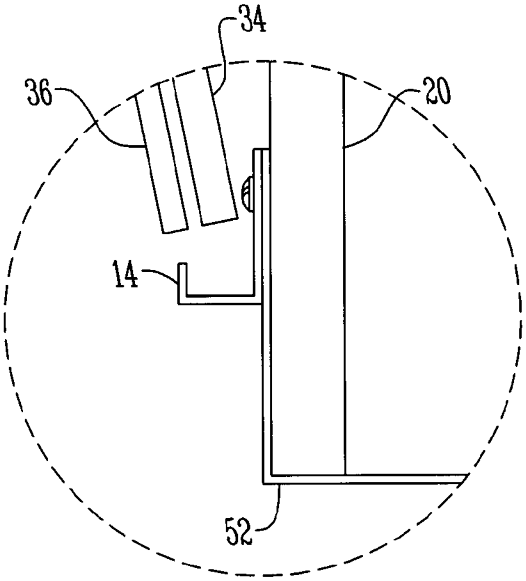
FIG. 8 is a close-up elevation view of the spa of FIG. 7 focused on the periphery of the cabinet assembly, the channel positioned above the ground a distance to and the pan having an upwardly extending lip to protect and covering the bottom and exterior surface of the cabinet assembly.

Yet another alternative embodiment is presented with reference to FIGS. 7 and 8 that is similar to the embodiment of FIGS. 5 and 6. In the arrangement of FIGS. 7 and 8 the toe kick 50 has been removed and with the channel 14 positioned above the bottom of cabinet assembly 10 a distance. That is, the channel 14 is connected to brace member 20 above the ground or bottom a distance. This arrangement provided an amount of relief, or a recess, around the bottom of the spa 10 which allows a user's toes to occupy when they are standing next to the spa 10.

As is shown in FIGS. 7 and 8, the outward edge of pan 52 terminates in an upwardly extending lip which is positioned between the interior side of channel 14 and exterior side of brace member 20. In this way, the pan 52 forms an upwardly facing bowl, cavity or recess. At a minimum lip extends upwardly at least the distance the bottom of channel 14 is positioned above the ground. In this way, the pan 52 encloses the open interior of the cabinet assembly 10 thereby keeping contaminants out of the interior of spa assembly 10. In this arrangement, the pan 52 having the upwardly extending flange or lip is formed of a single molded piece such as through vacuum molding, injection molding or the like. The single molded piece is formed as either a rigid piece, a semi-rigid piece or a flexible piece.

By positioning the channel 14 above the ground and eliminating the use of toe kick 50, this eliminates components and reduces costs for the cabinet assembly 10. Also, by raising the channel 14 above the ground, this shortens the slats 36, which are relatively expensive components, thereby further reducing the cost of the cabinet assembly 10.

Figure 9:
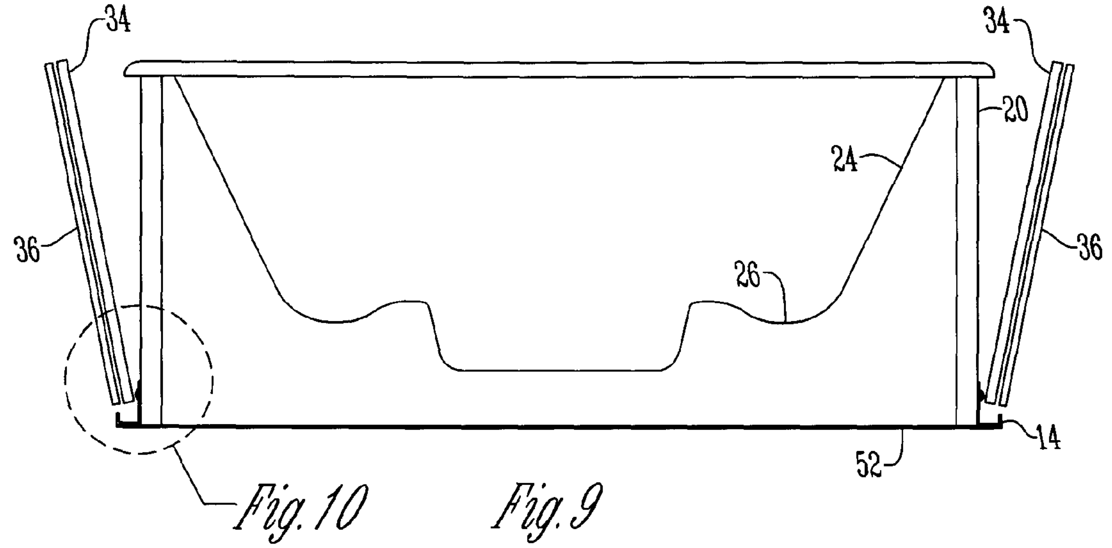
FIG. 9 is an elevation view of a modified version of the spa of FIG. 5 where the channel has been lowered to engage the pan directly.
Figure 10:
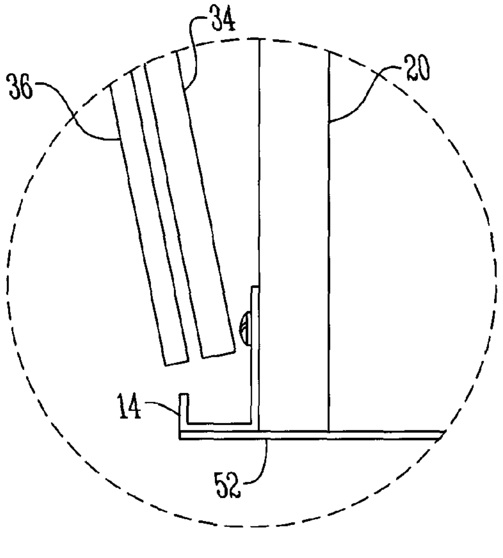
FIG. 10 is a close-up elevation view of the spa of FIG. 9 focused on the periphery of the cabinet assembly, the channel positioned in engagement with the pan adjacent the ground.

Yet another alternative embodiment is presented with reference to FIGS. 9 and 10 that is similar to the embodiment of FIGS. 5 and 6. In the arrangement of FIGS. 9 and 10 the toe kick 50 has been removed and with the channel 14 positioned directly on the top surface of the pan 52. This arrangement eliminates the need for the additional component of toe kick 50.

The alternative embodiments of FIGS. 5-10 are just a few examples which depict the versatility and array of arrangements that are easily created using cabinet assembly 10. In operation: The cabinet is assembled in the manner described herein. The pan 52 is adhesively secured to the bottom surfaces of cabinet assembly 10 which it comes into contact, such as the entire periphery of frame 12 and/or toe kick 50. Toe kick 50 is secured to the frame 12 and channel 14 is positioned on top of toe kick 50 and secured to frame 12.

Once formed, pan 52 functions to keep the interior of cabinet 10 clean, dry, warm and free of contaminants, insects and rodents thereby improving the useful life of the spa. The toe kick 50 engages the ground, but due to its composition, resists deterioration thereby also extending the useful life of the spa. In addition, because the toe kick 50 extends upwardly from the bottom end of the cabinet assembly 10 the length of slats 36 are shortened. This reduces the cost of the cabinet assembly 10 as the toe kick 50 can be formed of a less expensive material than slats 36.

As is shown, a plurality of configurations are easily created using the cabinet assembly 10, each having their own benefits and each being suitable for different applications.

In view of the disclosure and figures, one of ordinary skill in the art will appreciate that the spa and cabinet assembly presented herein is an improvement over the state of the art and that all objectives have been accomplished as are stated herein. Namely, the spa presented is both efficient and cost effective; it resists deterioration over time and it is aesthetically pleasing.

It will be appreciated by those skilled in the art that other various modifications could be made to the device without departing from the spirit and scope of this invention. All such modifications and changes fall within the scope of the claims and are intended to be covered thereby.

What is claimed is:

1. A method of attaching a cabinet assembly to a spa the method comprising:

providing a frame having a channel adjacent a bottom end;

placing a spa onto the frame such that a flange extending from the spa adjacent a top end is positioned in parallel spaced relation to the channel; and securing a plurality of slats between the flange of the spa and the channel to form a cabinet around the spa;

wherein the slats have a bottom end positioned in the channel and a top end positioned adjacent the flange such that flange and the channel place tension on the slats;

wherein a pan is connected to the bottom of the spa and encloses the cabinet assembly.

2. The method of claim 1 further comprising the step of inserting at least one insulating panel between the flange of the spa and the channel before securing the plurality of slats between the flange of the spa and the channel.

3. The method of claim 1 wherein the frame comprises four post members placed in spaced relation such that the channel extends between and is secured to the post members.

4. The method of claim 1 wherein the plurality of slats are secured between the flange of the spa and the channel by snapping the plurality of slats in place such that the flange of the spa and the channel place tension on the plurality of slats.

5. The method of claim 1 wherein a fastening element is not used to secure the plurality of slats between the flange of the spa and the channel.

6. The method of claim 1 wherein the channel is U-shaped.

7. The method of claim 1 wherein the plurality of slats are elastic allowing the slats to be bent when securing the plurality of slats between the flange of the spa and the channel.

8. The method of claim 1 wherein a toe kick is positioned between the pan and the channel.

9. The method of claim 8 wherein the channel and the pan are formed of two separate pieces.

10. The method of claim 1 wherein the channel is positioned a distance above the bottom end of the frame to provide a recess around the bottom end of the cabinet assembly.

11. The method of claim 1 wherein the channel is J-shaped with an interior lip extending a longer distance than an exterior lip.

12. The method of claim 1 wherein an insulating panel is held within the channel behind the slats.

13. The method of claim 12 wherein the insulating panel provides frictional force against the slats thereby helping to hold the slats within the channel.

14. A cabinet assembly for a spa comprising:

a frame having a top side and a bottom side;

a spa placed into and supported by the frame;

the spa having a flange extending outwardly past the frame;

a channel connected to the frame adjacent the bottom side;

a pan secured to the bottom side of the frame;

wherein the pan encloses the bottom end of the cabinet assembly;

wherein a plurality of slats having a top end and a bottom end are connected to the cabinet assembly such that the bottom end of the slats are engaged in the channel, and the top end of the slats are positioned adjacent the flange wherein the connection of the slats with the cabinet assembly cause the slats to be in tension.

15. The cabinet assembly for the spa of claim 14 further comprising a toe kick positioned around the periphery of the frame adjacent the bottom end of the frame.

16. The cabinet assembly for the spa of claim 14 wherein the plurality of slats are elastic allowing the slats to be bent when securing the plurality of slats between the flange of the spa and the channel.

17. The cabinet assembly for a spa of claim 14 wherein the pan is adhesively secured to the bottom surface of the frame.

18. The cabinet assembly for the spa of claim 14 wherein the pan terminates in an upwardly extending lip.

19. The cabinet assembly for the spa of claim 14 further comprising an insulating panel positioned within the channel behind the slats.

20. The cabinet assembly for the spa of claim 14 wherein the channel is positioned a distance above the bottom end of the frame to provide a recess around the bottom end of the cabinet assembly.

* * * * *